(12) United States Patent
Colman et al.

(10) Patent No.: US 11,474,413 B2
(45) Date of Patent: Oct. 18, 2022

(54) METHOD FOR TRANSPOSING THE FREQUENCY OF AN OPTICAL SIGNAL BY MIXING A PLURALITY OF WAVES

(71) Applicants: CENTRE NATIONAL DE LA RECHERCHE SCIENTIFIQUE-CNRS-, Paris (FR); UNIVERSITE DE BOURGOGNE, Dijon (FR)

(72) Inventors: Pierre Colman, Dijon (FR); Alexandre Parriaux, Dijon (FR); Kamal Hammani, Chatenoy-le-Royal (FR); Guy Millot, Chevannes (FR)

(73) Assignees: CENTRE NATIONAL DE LA RECHERCHE SCIENTIFIQUE—CNRS—, Paris (FR); UNIVERSITE DE BOURGOGNE, Dijon (FR)

( * ) Notice: Subject to any disclaimer, the term of this patent is extended or adjusted under 35 U.S.C. 154(b) by 0 days.

(21) Appl. No.: 17/421,843

(22) PCT Filed: Jan. 15, 2020

(86) PCT No.: PCT/FR2020/050055
§ 371 (c)(1),
(2) Date: Jul. 9, 2021

(87) PCT Pub. No.: WO2020/148506
PCT Pub. Date: Jul. 23, 2020

(65) Prior Publication Data
US 2022/0100050 A1 Mar. 31, 2022

(30) Foreign Application Priority Data
Jan. 18, 2019 (FR) ..................................... 19 00450

(51) Int. Cl.
*G02F 1/35* (2006.01)
*G02F 1/365* (2006.01)

(52) U.S. Cl.
CPC .......... *G02F 1/3536* (2013.01); *G02F 1/3544* (2013.01); *G02F 1/365* (2013.01)

(58) Field of Classification Search
None
See application file for complete search history.

(56) References Cited

U.S. PATENT DOCUMENTS

| 2014/0217269 | A1 | 8/2014 | Guo et al. | |
| 2022/0100050 | A1* | 3/2022 | Colman | G02F 1/3536 |

FOREIGN PATENT DOCUMENTS

| WO | 2011113499 A1 | 9/2011 | |
| WO | 2017149319 A1 | 9/2017 | |
| WO | WO-2019222263 A1 * | 11/2019 | ........... G02F 1/3509 |

OTHER PUBLICATIONS

A. Parriaux, K. Hammani and G. Millot, "Frequency Comb Generation at 2 μm with Electro-Optic Modulators for Spectroscopic Applications," 2019 Conference on Lasers and Electro-Optics Europe & European Quantum Electronics Conference (CLEO/Europe-EQEC), 2019, pp. 1-1. (Year: 2019).*

(Continued)

*Primary Examiner* — Rhonda S Peace
(74) *Attorney, Agent, or Firm* — Maier & Maier, PLLC (57) ABSTRACT

A method for frequency-converting a source optical signal in order to produce a useful optical signal, by mixing a plurality of waves, implements a plurality of waveguides that are coupled together. Individual parameter values of the waveguides, as well as at least one coupling parameter, are selected so as to obtain the useful signal with a high intensity. Such a method for producing the useful signal is (Continued)

suitable for a spectroscopic application, in particular a molecular spectroscopy application.

11 Claims, 2 Drawing Sheets

(56) References Cited

OTHER PUBLICATIONS

International Search Report and Written Opinion dated Mar. 19, 2020 in corresponding application No. PCT/FR2020/050055; 7 pgs.
Ivan Biaggio et al. "Coupling-length phase matching for nonlinear optical frequency conversion in parallel waveguides" Physical Review A (Atomic, Molecular, and Optical Physics), USA, vol. 90, No. 4, Oct. 1, 2014 (Oct. 1, 2014).

* cited by examiner

METHOD FOR TRANSPOSING THE FREQUENCY OF AN OPTICAL SIGNAL BY MIXING A PLURALITY OF WAVES

FIELD

The invention relates to a method for transposing the frequency (frequency-conversion) of an optical signal by mixing a plurality of waves, for example, using four-wave mixing, as well as to a device for implementing such a method.

BACKGROUND

Molecular spectroscopy applications require the provision of an optical radiation with a wavelength ranging between 2 μm (micrometer) and 6 μm. However, radiation sources that can operate in this spectral range and that have the features required for these applications are very expensive or are not available. It has therefore been proposed that the radiation that is required for such spectroscopic application is produced from a laser source that operates at about 1.55 μm, since such laser sources are available at a low cost by virtue of their mass use for telecommunication applications. The optical signal that is produced by the laser source, the wavelength of which optical signal is approximately 1.55 μm, then undergoes frequency-conversion in order to obtain an optical signal that is useful for the desired application, for example, a useful optical signal that is in the 2 μm-6 μm spectral band. Throughout the present description, the cited wavelengths relate to the free-space propagation of the electromagnetic radiation in vacuum or air. When a considered radiation propagates in one or more waveguide(s), the wavelength value cited for this radiation is that of a radiation with the same frequency as that in the waveguide(s), but which would freely propagate in vacuum or air.

In a known manner, the frequency-conversion of a source optical signal to produce a useful optical signal can be performed using a non-linear mechanism, called four-wave mixing, which may result from an optical Kerr effect. To this end, one or two optical pumping radiation(s) is (are) used to convert two photons of this (these) pumping radiation(s) into a photon of the useful signal and an additional photon of the source signal. The case where the two pump photons belong to one and same monochromatic radiation is called degenerate case, as opposed to a non-degenerate case where the two pump photons have different wavelength values. Such frequency-conversion mechanism is most often implemented within a waveguide, for example, within an optical fiber or an integrated waveguide, by simultaneously injecting the one or the two pumping radiation(s) and the source signal into this waveguide, and extracting the useful signal therefrom.

However, in order to occur, the non-linear four-wave mixing mechanism requires that a relationship, called phase-matching relationship, is met. This phase-matching relationship applies to the propagation constants k that are effective in the waveguide where the four-wave mixing occurs. It is of the following form: $k(\lambda_{pump1})+k(\lambda_{pump2})-k(\lambda_{source})-k(\lambda_{useful})+\varepsilon=0$, where $k(\lambda_{pump1})$ and $k(\lambda_{pump2})$ are the propagation constants of the two pumping radiations in the used waveguide, $k(\lambda_{source})$ is the propagation constant of the source signal in this same waveguide, and $k(\lambda_{useful})$ is the propagation constant of the useful signal also in this same waveguide. $\varepsilon$ is a non-linear term, in general very weak, the expression of which is known, and which depends in particular on the power of the pumping radiations. The propagation constants $k(\lambda_{pump1})$, $k(\lambda_{pump2})$, $k(\lambda_{source})$ and $k(\lambda_{useful})$ express the guided nature of the propagation of the pumping radiations, of the source signal and of the useful signal in the waveguide that is used to produce the frequency conversion. In a known manner, each of the pumping radiations, the source signal and the useful signal propagates in the waveguide according to a normal mode thereof, also referred to as eigenmode, and the dependence of the propagation constant k as a function of the wavelength is the dispersion relationship of this normal mode. The value of each of the propagation constants $k(\lambda_{pump1})$, $k(\lambda_{pump2})$, $k(\lambda_{source})$ and $k(\lambda_{useful})$ also depends, in accordance with the normal mode of the waveguide, on parameters of this waveguide, in particular on geometric parameters thereof and on optical parameters of its constituting materials. The values of these parameters of the waveguide then must be selected so that the phase-matching relationship is met for values of $\lambda_{pump1}$, $\lambda_{pump2}$ and $\lambda_{source}$ that are within spectral ranges of the optical sources used to produce the pumping radiations and the source signal, respectively, and for a value of $\lambda_{useful}$ that is suitable for the desired application for the useful signal. In the particular case of a degenerate pumping radiation, the phase-matching relationship becomes: $2 \cdot k(\lambda_{pump})-k(\lambda_{source})-k(\lambda_{useful})+\varepsilon=0$, where $\lambda_{pump}$ is the wavelength of the degenerate pumping radiation.

However, the number of parameters of the waveguide that are available is insufficient to allow the phase-matching relationship to be met simultaneously for values of $\lambda_{pump1}$, $\lambda_{pump2}$, $\lambda_{source}$ and $\lambda_{useful}$ within desired ranges. Then, it has been proposed, in particular in the article entitled "Coupling-length phase matching for nonlinear optical frequency conversion in parallel waveguides", by Ivan Biaggio, Virginie Coda and Germano Montemezzani, Physics Review A 90, 043816, 2014, for the waveguide that is used to produce the frequency-conversion by four-wave mixing to be coupled to an additional waveguide. This coupling modifies at least some of the propagation constants $k(\lambda_{pump})$, $k(\lambda_{source})$ and $k(\lambda_{useful})$. In this way, additional parameters are available for adjusting the propagation constants $k(\lambda_{pump})$, $k(\lambda_{source})$ and $k(\lambda_{useful})$ that relate to the waveguide where the frequency-conversion occurs. These additional parameters relate to the additional waveguide and to the coupling that exists between both waveguides. It is thus possible to adjust the values of the parameters of the two coupled waveguides so that the phase-matching relationship is met on average for $\lambda_{pump}$, $\lambda_{source}$ and $\lambda_{useful}$ values that are of interest.

However, in such coupled waveguide system, the source signal, the one or more pumping radiation(s) and the useful signal are each progressively transferred from one waveguide to the other one during their propagation, repeatedly and alternately between both waveguides. Thus, each signal or radiation is alternately contained in one of the waveguides and then in the other one. As a result, the phase-matching relationship is only met transiently during these transfers of signals/radiation(s) between both waveguides. The useful signal then appears transiently and disappears thereafter, repeatedly, during the propagation of the radiations in the waveguides. By adapting the parameters of the system, it becomes possible to avoid each re-decrease of the intensity of the useful signal, so that this intensity increases in a manner that on average is linear in relation to a longitudinal coordinate of the waveguides. However, even by increasing the length of the waveguides, it is still impossible to achieve in this way an intensity of the useful signal that is sufficient for certain applications. Furthermore, when the waveguides are produced using the integrated optical circuit technology that is currently available, and when these waveguides are straight, their length is limited by the maximum size of the integrated optical circuits that is imposed by the tools of the technology that is used. In the current state, this maximum size is a few centimeters. However, bending the waveguides within an integrated optical circuit makes that the phase-matching relationship is no longer met at the bending locations of the waveguides.

Furthermore, splitting devices that are based on a plurality of coupled waveguides are commonly used to distribute between a plurality of outputs a light intensity that is injected at an input of such splitting device. This is a different use, which does not involve four-wave mixing produced by a non-linear effect. Most often, such light intensity splitting device has a waveguide length that is less than 100 µm, and a separation distance between the coupled waveguides that is less than 0.25 µm.

Based on this situation, an object of the present invention is to produce a useful signal by four-wave mixing with an intensity that is higher than in the prior art. In particular, the object of the invention is to produce a useful signal with an intensity that is sufficient for a spectroscopic application.

SUMMARY

To achieve this or another object, a first aspect of the invention proposes a new method for frequency-converting a source optical signal in order to produce a useful optical signal, by mixing a plurality of waves as a result of a non-linear interaction between these waves. The method comprises producing, within at least one waveguide, at least one photon of the useful signal from at least one photon of at least one optical pumping radiation. This combination of photons occurs in accordance with a phase-matching relationship, which connects respective propagation constants of the source signal, of each pumping radiation and of the useful signal, with these propagation constants being effective in said at least one waveguide. The invention equally applies when several photons of said at least one pumping radiation that are involved in the wave mixing are degenerate or non-degenerate.

Each waveguide has at least one individual normal mode—or eigenmode—that is effective for each of the source signal, of the at least one pumping radiation and of the useful signal propagating in this waveguide separately from each other waveguide. In addition, each waveguide has at least one individual parameter that modifies an dispersion relationship which is effective for the source signal, each pumping radiation and the useful signal that propagate in this waveguide according to its individual normal mode. Such an individual parameter may be, for example, a geometric parameter of the waveguide.

For the invention, said at least one waveguide comprises at least two waveguides that are arranged so that the individual normal mode of each waveguide is coupled with an individual normal mode of at least one another of the waveguides, for each of the source signal, of each pumping radiation and of the useful signal.

The method comprises simultaneously injecting the source signal and each pumping radiation into at least one of the waveguides, and extracting the useful signal from at least one of these waveguides. Then, since at least some of the individual normal modes of the waveguides are coupled, each of the source signal, of each pumping radiation and of the useful signal that propagates at a location in the waveguides according to the individual normal mode of one of the waveguides has an intensity distribution between several of the waveguides that varies along these waveguides.

Also for the invention, at least one coupling parameter, for example, at least one separation distance between the waveguides, modifies an intensity of the coupling that exists between the individual normal modes of at least two of the waveguides.

Then, according to the invention, respective values of the individual parameters of the waveguides and of said at least one coupling parameter are selected so that the phase-matching relationship is met for at least one set of respective propagation constants of the source signal, of each pumping radiation and of the useful signal, with each of these propagation constants relating to a collective normal mode of all of the waveguides. This collective normal mode, also called super-mode, is effective for the propagation of the source signal, of each pumping radiation or of the useful signal, and is such that the source signal, each pumping radiation or the useful signal that propagates in all of the waveguides according to this collective normal mode has an intensity distribution between the waveguides that is constant along the waveguides.

The invention therefore proposes selecting the values of the parameters of the waveguides and of each coupling parameter so that the phase-matching relationship is met for the propagation constants relating to the collective normal mode(s) of all the waveguides, such that this (these) collective normal mode(s), is (are) used by the source signal, each pumping radiation and the useful signal, as opposed to the propagation constants relating to the individual normal modes of the waveguides. In other words, by way of an example for a four-wave mixing case, the invention replaces the requirement of a phase-matching relationship of the type: $k_{individual}(\lambda_{pump1})+k_{individual}(\lambda_{pump2})-k_{individual}(\lambda_{source})-k_{individual}(\lambda_{useful})+\varepsilon_{individual}=0$ in the non-degenerate case, or of type: $2 \cdot k_{individual}(\lambda_{pump})-k_{individual}(\lambda_{source})-k_{individual}(\lambda_{useful})+\varepsilon_{individual}=0$ in the degenerate case, relating to one or more individual normal mode(s) of the waveguides, with the phase-matching relationship applied to one or more collective normal mode(s) of the waveguides: $k_{collective}(\lambda_{pump1})+k_{collective}(\lambda_{pump2})-k_{collective}(\lambda_{source})-k_{collective}(\lambda_{useful})+\varepsilon_{collective}=0$ in the non-degenerate case, or $2 \cdot k_{collective}(\lambda_{pump})-k_{collective}(\lambda_{source})-k_{collective}(\lambda_{useful})+\varepsilon_{collective}=0$ in the degenerate case.

As a result of the invention, in the general case of mixing a plurality of waves, the phase-matching relationship is continually met during the propagation of the source signal, of each pumping radiation and of the useful signal in the waveguides. For this reason, the intensity of the useful signal increases rapidly as a function of the longitudinal coordinate of the waveguides. It can thus reach higher levels, in particular intensity levels that are sufficient for the useful signal to be used in spectroscopy. In the case of four-wave mixing, in particular as produced by a Kerr effect, the intensity of the useful signal increases substantially quadratically as a function of the longitudinal coordinate of the waveguides.

Preferably, the mixing of a plurality of waves that is implemented in the invention may be three-, four-, five- or six-wave mixing. For example, three-wave mixing can result from a non-linear interaction of the second-order dielectric susceptibility type, also called chi-squared effect ($x^2$), and as is particularly produced by a lithium niobate material, in which the waves propagate. Six-wave mixing can result from a non-linear interaction of the plasma effect type.

Particularly advantageous implementations of the invention may correspond to four-wave mixing processes for producing the useful signal. For example, such four-wave mixing can result from a Kerr effect. In this case, a photon of the useful signal is produced with an additional photon of the source signal from two photons of the at least one pumping radiation.

Preferably, irrespective of the number of waves in the mixing and of the pumping radiations that can be degenerate or non-degenerate as appropriate, the waveguides that are used for the invention may be formed in an integrated optical circuit. They then produce confinement efficiencies for the optical signals and the optical radiations, which are higher than those that can be achieved using optical fiber technology. These waveguides using integrated optical circuit technology then may be curved without causing any losses of intensity that are significant for the normal modes of guided propagation. In this case, the waveguides that are used for the invention may be parallel to each other and arranged side-by-side in at least one portion of the integrated optical circuit. Their meandering or spiral arrangement allows them to be manufactured in integrated optical circuits, the dimensions of which are compatible with the available industrial tools.

Still with reference to waveguides that are part of an integrated optical circuit, at least two of these waveguides may be curved and parallel in a bend that is shared by these at least two waveguides. These waveguides thus have respective curvatures that are different in the bend. In such case, according to an improvement of the invention, at least some of the respective individual parameters of the two waveguides may have values in the bend, such that two parts of at least one and same signal or radiation from among the useful signal, each pumping radiation and the source signal, one of which propagates in any one of the curved waveguides and the other one which propagates in another one of these curved waveguides, according to the individual normal modes thereof, remain in-phase along radial directions each perpendicular to the curved waveguides in the bend. Then, parts of the useful signal, parts of the pumping radiation, or parts of the source signal, which propagate in the curved waveguides, remain in-phase with each other along the bend, exactly or even to the first-order in relation to a longitudinal coordinate of the waveguides in the bend. It is thus possible to fold the waveguides without reducing the efficiency of the multi-wave mixing for producing the useful signal.

Still for implementations of the invention using integrated optical circuit technology, the waveguides may have respective lengths that range between 1 mm (millimeter) and 100 mm, and any two of the waveguides that are neighboring may have a separation distance between them that ranges between 0.125 µm and 3 µm, when this distance is measured perpendicular to the two neighboring waveguides.

According to common variants of the integrated optical circuit technology, each waveguide may be made of a material that is selected from silicon (Si), titanium oxide ($TiO_2$) or silicon nitride ($Si_3N_4$), and may be formed on a quartz substrate ($SiO_2$), and thus may be embedded in a silica layer ($SiO_2$) acting as a sheath for each waveguide. In other integrated optical circuit technologies, the substrate and/or the sheath of each waveguide alternatively may be made of any dielectric material that has a refractive index value of less than 2.00 for the wavelengths of the useful signal, of each pumping radiation and of the source signal, including polymer materials or air.

In general, the following additional features may be reproduced for preferred improvements or embodiments of the invention, separately or by combining several of them together:

- the invention method may use from two to five waveguides, which are arranged so that an individual normal mode of each of these waveguides is coupled with an individual normal mode of at least one another of the waveguides, for each source signal, each pumping radiation and the useful signal. However, a particularly preferred configuration comprises two waveguides with an individual normal mode of one of these two waveguides that is coupled with an individual normal mode of the other one of the two waveguides, for each source signal, each pumping radiation and the useful signal;
- when a plurality of pumping radiations is involved in the phase matching relationship, these may have wavelength values that are identical. In other words, they may be degenerate. Thus, $\lambda_{pump1}=\lambda_{pump2}$ is possible, even preferred, for the case of four-wave mixing that can result from a Kerr effect;
- each waveguide may have only a single individual normal mode, in particular for the pumping radiation, for which the electric field of the signal or the radiation is mainly perpendicular to a juxtaposition plane of the waveguides. Such an individual normal mode is commonly called transverse electric polarization mode, and the waveguide is called single-mode waveguide;
- the respective individual normal modes of some of the waveguides may be coupled together by overlapping of evanescent waves that are generated by radiations that propagate in these waveguides according to their individual normal modes;
- said at least one individual parameter of each waveguide may comprise at least one dimension of a cross-section of this waveguide;
- said at least one coupling parameter between the waveguides may comprise at least one separation distance between two of the waveguides;
- when several waveguides are curved and parallel in a bend that is shared by these waveguides, an average value of the respective curvature radii of the waveguides in the bend may range between 10 µm and 1 mm;
- the values of the individual parameters of the waveguides and of said at least one coupling parameter advantageously may be selected so that, in addition, the phase-matching relationship is met to the nearest second-order in relation to a wavelength of the source signal, around a central wavelength value of this source signal;
- the source signal may have a spectrum assuming any shape, in particular a comb-shaped spectrum, within a spectral range that contains at least a portion of this source signal. In this case, in particular, the selection of the values of the individual parameters of the waveguides and of said at least one coupling parameter so that the phase-matching relationship is met to the nearest second-order in relation to a wavelength of the source signal, around a central wavelength value of this source signal, is particularly advantageous;
- two opposite ends of a same one of the waveguides may be connected to each other in order to form a loop for recirculating optical signals and radiations. The intensity of the useful signal that is produced according to the invention can be even higher in this way;

the source signal may be made up of at least one spectral component that has a wavelength ranging between 1.3 µm and 1.8 µm, preferably between 1.5 µm and 1.6 µm;

each pumping radiation may be a laser radiation, the wavelength of which ranges between 1.2 µm and 2.6 µm, preferably between 1.7 µm and 2.1 µm;

the useful signal may be made up of at least one other spectral component that has a wavelength ranging between 2 µm and 6 µm, preferably between 2.2 µm and 4.5 µm; and the useful signal may be used for a spectroscopic application, in particular for a molecular spectroscopy application.

Also possibly, the invention method may be used to produce a plurality of different useful optical signals, in particular two different useful optical signals, by mixing a plurality of waves resulting from a non-linear interaction between these waves. In this case, the method involves simultaneously producing, within at least one waveguide, at least one photon of each of the useful signals with at least one additional photon of the source signal from at least one photon of the at least one optical pumping radiation, in accordance with a phase-matching relationship, which connects respective propagation constants of the source signal, said at least one pumping radiation and each of the useful signals, that are effective in the at least one waveguide.

A second aspect of the invention proposes an optical device that is suitable for implementing a method according to the first aspect of the invention.

Such a device comprises a plurality of waveguides each having at least one individual normal mode that is effective for optical radiations propagating in this waveguide separately from each other waveguide. Moreover, each waveguide has at least one individual parameter that modifies a dispersion relationship effective for each radiation that propagates in this waveguide according to its individual normal mode.

The waveguides of the device are arranged so that the individual normal mode of each of the waveguides is coupled with an individual normal mode of at least one another of the waveguides. Thus, since at least some of the individual normal modes of the waveguides are coupled, each radiation that propagates at a location in the waveguides according to the individual normal mode of one of these waveguides has an intensity distribution several of the waveguides that varies throughout the waveguides.

For the invention, the device is such that at least one coupling parameter modifies an intensity of the coupling that exists between the individual normal modes of at least two of the waveguides.

Then, according to the invention, respective values of the individual parameters of the waveguides and of said at least one coupling parameter are such that a method according to the first aspect of the invention can be implemented using the device. In other words, these values of the individual parameters of the waveguides and of said at least one coupling parameter are such that the phase-matching relationship of a four-wave mixing process is met for a source signal, at least one pumping radiation and a useful signal that each propagate in the waveguides according to at least one collective normal mode of all of the waveguides of the device.

BRIEF DESCRIPTION OF THE FIGURES

The features and advantages of the present invention will become more clearly apparent from the following detailed description of non-limiting embodiments, with reference to the appended figures, in which.

DETAILED DESCRIPTION

For clarity sake, the dimensions of the elements that are shown in these figures correspond neither to actual dimensions nor to actual dimension ratios. In addition, identical reference signs that are indicated in different figures denote elements that are identical or that have identical functions.

Moreover, the invention is described hereafter in the case of four-wave mixing such as that resulting from a Kerr effect, and in the case of a pumping radiation that is degenerate: $\lambda_{pump1}=\lambda_{pump2}=\lambda_{pump}$ using the notations of the general part of the present description. However, a person skilled in the art will be able to apply this description to a case of pumping radiations that are not degenerate without exercising inventive skill, and also to the case of a non-linear interaction that produces a different wave mixing process.

Figure 1A:
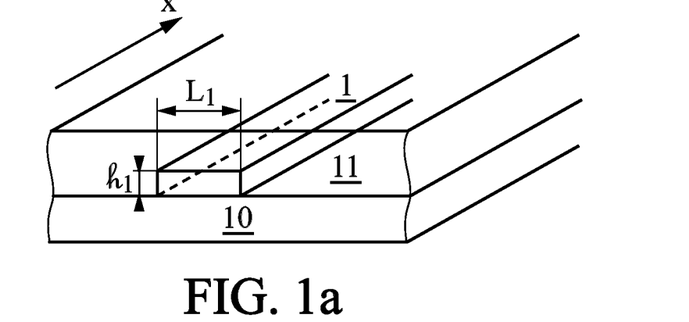
FIG. 1a is a perspective view of an integrated optical circuit with a single waveguide.

[FIG. 1a] shows a waveguide that is produced in an integrated optical circuit, and the structure of which may be used to implement the invention. Reference sign 10 denotes a substrate of the integrated optical circuit, for example, a quartz substrate, reference sign 1 denotes the waveguide, and reference sign 11 denotes a coating layer of the waveguide 1. The waveguide 1 may be formed by a waveguide core that is made of a material with an optical refractive index that is greater than those of the substrate 10 and of the layer 11, for optical radiations intended to be confined in this waveguide. The material of the waveguide 1 may be silicon (Si), titanium oxide ($TiO_2$) or silicon nitride ($Si_3N_4$), by way of non-limiting examples. By virtue of the difference in the refractive index value between the waveguide 1 and the materials of the substrate 10 and of the layer 11, sufficient confinement efficiency is obtained for the radiations that are guided by the waveguide 1, so that this waveguide can have a variable curvature without causing any losses of intensity that are detrimental for each guided radiation. In a known manner, such waveguide 1 has one or more normal mode(s), which is (are) effective for the propagation of each optical radiation along this waveguide. Then, each normal mode has a dispersion relationship $k_1(\lambda)$ that connects a propagation constant $k_1$ of the radiation, as guided by the waveguide 1 according to this normal mode, to a wavelength value $\lambda$ for this radiation when it propagates in vacuum or air. By way of a reminder: $\lambda=2\pi C/f$, where C is the celerity of light in vacuum and f is the frequency of the radiation, which is identical when this radiation propagates in vacuum and when it propagates in a manner guided by the waveguide 1. In a yet known manner, each dispersion relationship $k_1(\lambda)$ of a normal mode also depends on parameters of the waveguide 1, for example, the height $h_1$ and the width $L_1$ of this waveguide. Commonly, the height $h_1$ may be 0.22 µm or 0.34 µm, and the width $L_1$ may be of the order of a few micrometers for the wavelength values that will be cited hereafter. Without being a requirement or a limitation, it can be assumed that each waveguide is a single-mode waveguide. Finally, in a yet known manner, a radiation that propagates in a manner guided by the waveguide 1, i.e. along its longitudinal direction x, simultaneously has a travelling wave structure in this direction x and an evanescent wave structure in planes perpendicular to the direction x, outside the waveguide 1. Such normal mode has been referred to as the individual normal mode of the waveguide 1.

Figure 1B:
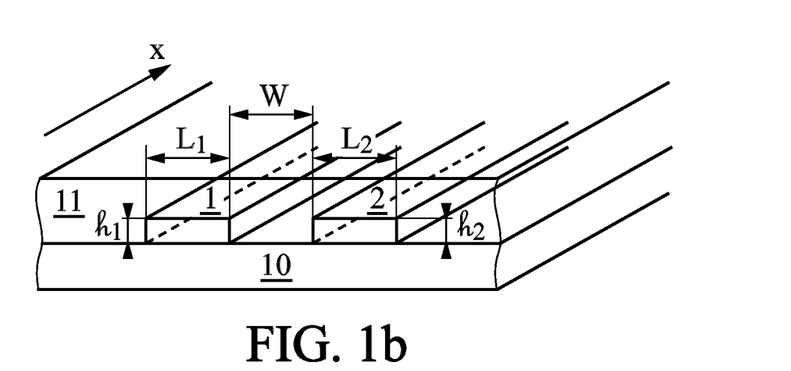
FIG. 1b corresponds to FIG. 1a for an integrated optical circuit with a plurality of waveguides, as used in the present invention.

[FIG. 1b] shows an integrated optical circuit such as that which can be used for the present invention. It has a substrate structure 10 and a coating layer 11, which is similar to that of [FIG. 1a] but comprises a plurality of waveguides that are juxtaposed on the surface of the substrate 10. In a non-limiting manner and for the sake of the clarity of the following description, it will be assumed that the circuit comprises only two waveguides 1 and 2. In the light of the description provided in this case of two waveguides, a person skilled in the art will be able to generalize the features to any number of coupled waveguides. $h_1$ and $L_1$ respectively denote the height and width of the waveguide 1, $h_2$ and $L_2$ respectively denote the height and width of the waveguide 2, and W denotes the separation distance between them. The two waveguides 1 and 2 are assumed to be substantially parallel, and neighboring in planes perpendicular to these waveguides. x is the common longitudinal coordinate of the two waveguides. Each waveguide therefore extends between values 0 and L of the coordinate x. Typically, L may range between 5 mm and 100 mm.

When the separation distance W is less than or of the order of the evanescent transverse extension of the individual normal mode of at least one of the waveguides 1 and 2, the resulting overlap between the individual normal modes of the two waveguides produces a coupling between these normal modes. This coupling is even more intense when the separation distance W is short. Typically, W may range between 0.125 µm and 3 µm.

Actually, the individual normal modes of the two waveguides 1 and 2 as described until now, and each corresponding to the radiation that is only confined on one of the two waveguides, is no longer a normal mode for the set of both coupled waveguides. Then, radiation which is injected into one of the two waveguides will oscillate from one waveguide to the other during its propagation in the longitudinal direction x. As a result, a non-linear effect, such as the optical Kerr effect, can only occur in an extent that varies substantially periodically with the coordinate x. A radiation that is generated by this non-linear effect then has an average intensity that remains limited. It is possible to locally modify the dispersion relationships of the individual normal modes of the two waveguides 1 and 2 by varying the values of $h_1$, $L_1$, $h_2$, $L_2$ and W as a function of x, so that the radiation that is produced by the non-linear effect accumulates gradually. Its intensity can then increase on average linearly as a function of x. However, such a linear increase in the intensity of the radiation that is generated by the non-linear effect remains insufficient for many applications.

The invention then proposes a new setting of the parameters of each waveguide 1 and 2, and of the coupling parameter, which produces a faster increase in the intensity of the radiation that is produced by the non-linear effect.

According to the invention, the values of $h_1$, $L_1$, $h_2$, $L_2$ and W are selected to meet the phase-matching relationship of the non-linear effect with the propagation constants of the normal modes of all of the coupled waveguides. These normal modes of all of the coupled waveguides have been referred to as collective normal modes of the coupled waveguides. Each propagation constant that is used for the phase-matching relationship is therefore that of one of these collective normal modes.

Figure 2:
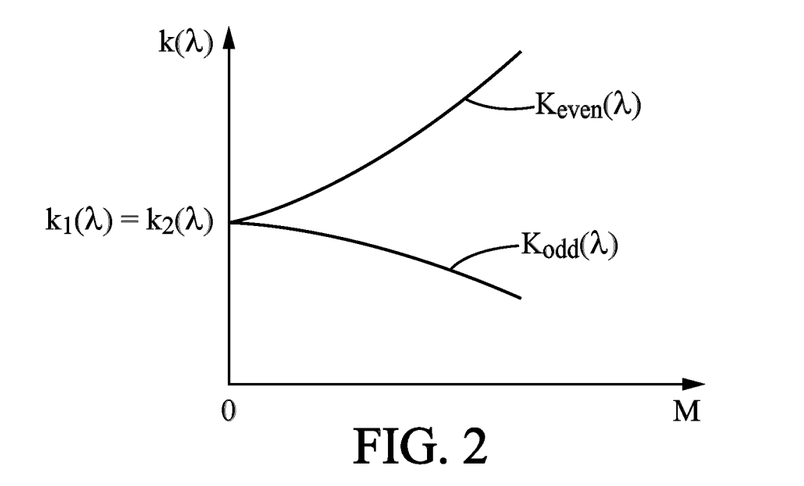
FIG. 2 is a diagram that schematically shows a coupling erect between two waveguides onto a normal mode propagation constant.

[FIG. 2] illustrates the modification of the dispersion relationships that is produced by the coupling between the waveguides, in the case of both waveguides 1 and 2, as shown in [FIG. 1b.] For the sake of simplicity, it is also assumed that these two waveguides are identical. Therefore, $h_1=h_2$ and $L_1=L_2$ in particular. A person skilled in the art will still be able to extend the presented principles to sets of coupled waveguides that comprise more than two waveguides, and to cases where the waveguides may be different. The ordinate axis of the diagram of [FIG. 2] denotes effective propagation constant values $k(\lambda)$ for a radiation of wavelength $\lambda$. Subsequently, this wavelength $\lambda$ alternately will be that of the source signal, the pumping radiation or that of the useful signal. The abscissa axis of the diagram denotes an intensity of the coupling between the waveguides 1 and 2, denoted M. This coupling intensity M is a decreasing function of the separation distance W between the two waveguides 1 and 2. In the absence of coupling (M=0), the two propagation constants $k_1(\lambda)$ and $k_2(\lambda)$, which separately relate to the respective individual normal modes of the two waveguides 1 and 2, assumed to be single-mode waveguides, are equal: $k_1(\lambda)=k_2(\lambda)$. When the coupling intensity M increases, a degenerescence suppression occurs, creating the following two collective normal states, each relating to the pair of waveguides 1 and 2: an even collective normal state, for which the electric field is symmetrically distributed in both waveguides, and an odd collective normal state, for which the electric field is distributed antisymmetrically in both waveguides. The propagation constant of the even collective normal state is $k_{even}(\lambda)$, and that of the odd collective normal state is $k_{odd}(\lambda)$. Given that these are collective normal states of the set of two waveguides, a radiation that propagates along the coordinate x in a manner that is guided by the pair of waveguides 1 and 2, according to any of these collective normal modes, has an intensity that is constant as a function of x, in the absence of a non-linear effect.

The non-linear effect, for example, the optical Kerr effect, which is used to produce a useful optical signal, simultaneously produces a photon of this useful signal and a photon of a source optical signal from two photons of an optical pumping radiation. The source signal and the pumping radiation are injected into the waveguides 1 and 2, or at least into one of them, and when they propagate along the longitudinal coordinate x the intensity of the pumping radiation decreases, whereas those of the source signal and of the useful signal increase. The aim is to achieve a sufficient intensity for the useful signal at x=L, while the intensity of this useful signal is zero at x=0. To ensure that the non-linear effect occurs, a phase-matching relationship has to be verified, which connects the propagation constants of the source signal, of the pumping radiation and of the useful signal. This phase-matching relationship is of the following form: $2 \cdot k(\lambda_{pump}) - k(\lambda_{useful}) - k(\lambda_{source}) + \varepsilon = 0$, where $\lambda_{pump}$ is the free-space propagation wavelength in vacuum of the pumping radiation, $\lambda_{useful}$ is the free-space propagation wavelength in vacuum of the useful signal, $\lambda_{source}$ is the free-space propagation wavelength in vacuum of the source signal, and $\varepsilon$ is a low-value non-linear term, the expression of which is known. According to the invention, the values of the propagation constants $k(\lambda_{pump})$, $k(\lambda_{useful})$ and $k(\lambda_{source})$ to be introduced into this phase-matching relationship each relate to a collective normal mode of the coupled waveguides. However, this collective normal mode may not be the same between any two from among the source signal, the pumping radiation and the useful signal. Thus, for the case of the two coupled waveguides of [FIG. 1b] and [FIG. 2], the following combinations are possible according to the invention:

$2 \cdot k_{odd}(\lambda_{pump}) - k_{odd}(\lambda_{useful}) - k_{odd}(\lambda_{source}) + \varepsilon = 0;$ $2 \cdot k_{even}(\lambda_{pump}) - k_{odd}(\lambda_{useful}) - k_{odd}(\lambda_{source}) + \varepsilon = 0;$ $2 \cdot k_{odd}(\lambda_{pump}) - k_{even}(\lambda_{useful}) - k_{even}(\lambda_{source}) + \varepsilon = 0;$ $2 \cdot k_{even}(\lambda_{pump}) - k_{even}(\lambda_{useful}) - k_{even}(\lambda_{source}) + \varepsilon = 0;$ $k_{odd}(\lambda_{pump}) + k_{even}(\lambda_{pump}) - k_{even}(\lambda_{useful}) - k_{odd}(\lambda_{source}) + \varepsilon = 0;$ $k_{odd}(\lambda_{pump}) + k_{even}(\lambda_{pump}) - k_{odd}(\lambda_{useful}) - k_{even}(\lambda_{source}) + \varepsilon = 0.$ In order to produce the useful signal according to the invention, at least one of these relationships is to be met for at least one value of $\lambda_{useful}$ in the spectral range that is desired for the contemplated application of the useful signal, and for at least one value of $\lambda_{source}$ and at least one value of $\lambda_{pump}$ that must be adopted. The existence of such a triplet of values $\lambda_{useful}$, $\lambda_{source}$, $\lambda_{pump}$ is provided by a suitable selection of values for $h_1$, $L_1$, $h_2$, $L_2$ and W that configure each of the $k_{odd}(\lambda)$ and $k_{even}(\lambda)$ dispersion relationships, where $\lambda$ still generically denotes one of the wavelengths $\lambda_{useful}$, $\lambda_{source}$ and $\lambda_{pump}$. These values of $h_1$, $L_1$, $h_2$, $L_2$ and W can be found using digital computations, from the $k_{odd}(\lambda, h_1, L_1, h_2, L_2, W)$ and $k_{even}(\lambda, h_1, L_1, h_2, L_2, W)$ functions. According to a possible method for finding a solution, the function $f(\lambda_{source}) = 2 \cdot k_{odd}(\lambda_{pump}, h_1, L_1, h_2, L_2, k_{odd}(\lambda_{useful}, h_1, L_1, h_2, L_2, W) - k_{odd}(\lambda_{source}, h_1, L_1, h_2, L_2, W) + \varepsilon$ can be plotted as a function of $\lambda_{source}$, with the values of $\lambda_{pump}$, $\lambda_{useful}$, $h_1$, $L_1$, $h_2$, $L_2$ and W being fixed, and a search is undertaken for the existence of a value of $\lambda_{source}$ corresponding to a radiation emission unit that would be available for the source signal, and for which this function $f(\lambda_{source})$ is cancelled. This search is subsequently restarted for other values of $\lambda_{pump}$, $\lambda_{useful}$, $h_1$, $L_1$, $h_2$, $L_2$ and W, and also for each of the combinations of the odd and even collective normal modes between the source signal, the pumping radiation and the useful signal, as cited above for obtaining solutions of several phase-matching relationships that are all possible. Solutions thus can be found whereby $\lambda_{source}$ ranges between 1.3 µm and 1.8 µm, preferably between 1.5 µm and 1.6 µm. Such values correspond to laser emission sources that are commonly used for telecommunication applications. $\lambda_{pump}$ can range between 1.2 µm and 2.6 µm, preferably between 1.7 µm and 2.1 µm, corresponding to thulium-doped fiber laser emission sources. Finally, $\lambda_{useful}$ can range between 2 µm and 6 µm, preferably between 2.2 µm and 4.5 µm, in order to be suitable for a molecular spectroscopy application, for example. To this end, a common value equal to 0.22 µm or 0.34 µm can be assigned to the heights $h_1$ and $h_2$ of the waveguides 1 and 2, and the separation distance W can range between 0.125 µm and 3 µm. $L_1$ and $L_2$ can be identical and can range between 0.370 µm and 2.10 µm.

In practice, the equation $2 \cdot k_{odd}(\lambda_{pump}, h_1, L_1, h_2, L_2, W) - k_{odd}(\lambda_{useful}, h_1, L_1, h_2, L_2, W) - k_{odd}(\lambda_{source}, h_1, L_1, h_2, L_2, W) + \varepsilon = 0$ simply can be replaced with the inequality $2 \cdot k_{odd}(\lambda_{pump}, h_1, L_1, h_2, L_2, W) - k_{odd}(\lambda_{useful}, h_1, L_1, h_2, L_2, W) - k_{odd}(\lambda_{source}, h_1, L_1, h_2, L_2, W) < \pi/L$, and likewise for each other phase-matching equation, where L still denotes the common length of the two waveguides 1 and 2 along the longitudinal coordinate axis x. Each of these phase-matching inequalities is generically denoted hereafter as $\Delta k_{collective} < \pi/L$, to designate all the combinations of the odd and even collective normal modes between the source signal, the pumping radiation and the useful signal. The non-linear term $\varepsilon$ then does not need to be computed, and the knowledge of the dispersion relationships of the collective normal modes $k_{odd}(\lambda)$ and $k_{even}(\lambda)$ is sufficient.

Figure 3:
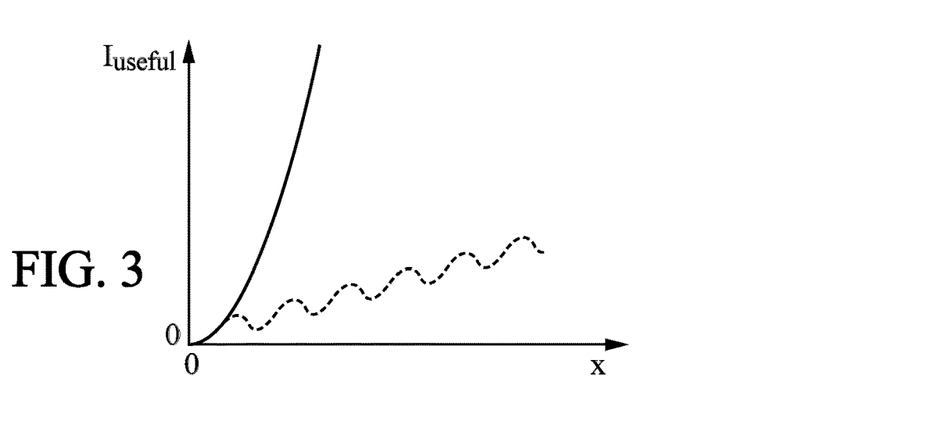
FIG. 3 is a useful signal intensity diagram showing an efficiency of the invention.

[FIG. 3] shows the variation as a function of the longitudinal coordinate x, of the intensity $l_{useful}$ of the useful signal for one of the collective normal modes (solid line curve). This variation is substantially of the quadratic type, allowing the useful signal to be obtained with a high intensity. Thus, the intensity of the useful signal increases rapidly as a function of the longitudinal coordinate x, to a saturation value, not shown. For example, values of $l_{useful}$ that are greater than a few tens of milliwatts can be obtained for L=100 mm. Most often, to obtain a value of $l_{useful}$ that is sufficient for the contemplated application, L is greater than 5 mm. By way of a comparison, the dashed line curve in [FIG. 3] corresponds to the intensity $l_{useful}$ that can be obtained at best when the values of $h_1$, $L_1$, $h_2$, $L_2$ and W are selected so that the phase-matching relationship is met by using the dispersion relationships of the individual normal modes of the waveguides 1 and 2: $k_1(\lambda, h_1, L_1, h_2, L_2, W)$ or $k_2(\lambda, h_1, L_1, h_2, L_2, W)$.

Some applications require that the useful signal is made up of a plurality of spectral components, such as, for example, a comb of wavelengths within a spectral range around an average wavelength value $\lambda_{useful}$ average. Then, if the pumping radiation is monochromatic, the generation of such useful signal requires using a comb of wavelengths for the source signal, around an average wavelength value $\lambda_{source}$ average. It is then necessary for the phase-matching relationship $f(\lambda_{source}) = 0$ or $\Delta k_{collective} < \pi/L$ to be verified to the nearest second-order for all the values of $\lambda_{source}$ in the vicinity of $\lambda_{source}$ average. To this end, values of $\lambda_{pump}$, $h_1$, $L_1$, $h_2$, $L_2$ and W must be found, which are such that the partial derivative of the f-function or of $\Delta k_{collective}$ with respect to $\lambda_{source}$ is zero for the values of $\lambda_{source}$ average and $\lambda_{useful}$ average, which verify $f(\lambda_{source\_average}, \lambda_{useful\_average}) = 0$ or $\Delta k_{collective}(\lambda_{source\_average}, \lambda_{useful\_average}) < \pi/L$. Equivalently, the partial derivative of the f-function or of $\Delta k_{collective}$ with respect to $\lambda_{useful}$ is zero for the values of $\lambda_{source}$ average and $\lambda_{useful}$ average.

Figure 4:
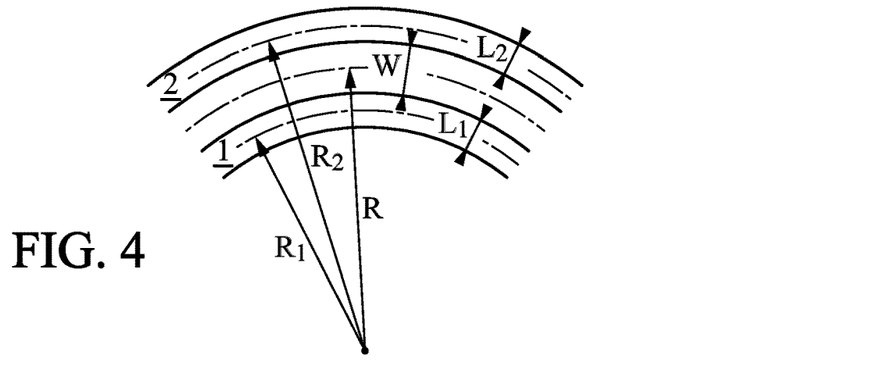
FIG. 4 is a in-plane view of a portion of an optical device according to the invention, which has an optimized local configuration.

In order to facilitate the manufacture of parallel waveguides in an integrated optical circuit, in particular when the length L is several centimeters, these waveguides may need to be bent in a plane parallel to the substrate, in order to reduce the lateral dimensions of this substrate. For example, the parallel waveguides can form meanders or can be wound on the surface of the substrate of the integrated optical circuit. [FIG. 4] represents a bend that is followed by the two parallel waveguides 1 and 2, with an average curvature radius R of the bend, measured at the halfway point of the separation distance W between the two waveguides. Then, so that the effect of the invention with respect to the significant increase in the intensity of the useful signal is maintained despite the curvature of the waveguides, it is necessary that a portion of the source signal (respectively of the useful signal and of the pumping radiation) that propagates in the waveguide 1 remains in phase, along radial directions in the bend, with another portion of the source signal (respectively of the useful signal and of the pumping radiation) that propagates in the waveguide 2. However, the two waveguides 1 and 2 have different curvature radii, respectively $R_1$ and $R_2$, which in different ways alter the optical path length within each waveguide 1 and 2. It is then advantageous to compensate for this alteration caused by the bending configuration, using modulations of the individual parameters of the two waveguides 1 and 2, for example, of their respective widths $L_1$ and $L_2$. Such compensation is expressed as $k_1 \cdot R_1 = k_2 \cdot R_2$ as a function of the propagation constants of the individual normal modes of the waveguides 1 and 2. It can be expressed in the first-order as follows, as a function of the average curvature radius R: $k_1 \cdot (R-(W+L_1)/2) = k_2 \cdot (R+(W+L_2)/2)$. In practice, the average curvature radius R can range between 25 μm and 1 mm, leading to a difference in width $L_1-L_2$ in the bend, between the two waveguides 1 and 2, which is of the order of or is less than 0.15 μm in absolute value when $h_1=h_2$, with the widest waveguide generally being the furthest outside the bend.

Figure 5:
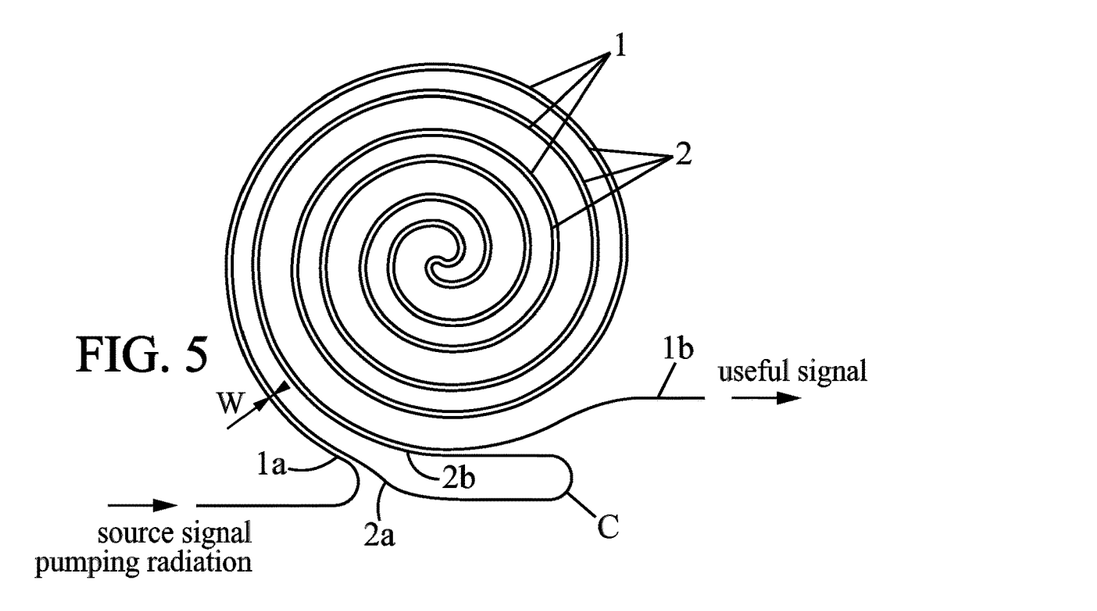
FIG. 5 is an in-plane view of a preferred embodiment of the invention.

[FIG. 5] illustrates an improvement of the invention, which enables an even faster increase in the intensity of the useful signal $l_{useful}$ as a function of the longitudinal coordinate x. Even though it is shown in this figure for a configuration with two waveguides that are wound as spirals, the improvement can be used with any shape for the waveguides. It applies when one of the waveguides, for example, the waveguide 2, is used neither to inject the source signal and the pumping radiation, nor to extract the useful signal. Then, the ends 2a and 2b of this waveguide 2 may be connected to each other to form a loop C for recirculating portions of the source signal, of the pumping radiation and of the useful signal that pass through the ends of the waveguide 2. Since the non-linear effect that generates the useful signal is of the stimulated-effect type, an enhancement of this effect is produced by recirculating portions of the source signal, of the pumping radiation and of the useful signal. For the embodiment of [FIG. 5], the source signal and the pumping radiation can be injected into the waveguide 1 via one end thereof, for example, the end 1a, and the useful signal can be extracted from the waveguide 1 via its other end 1b.

It is understood that the invention can be reproduced by modifying secondary aspects of the embodiments that have been described in detail above, while maintaining at least some of the cited advantages. In particular:
  an optical device according to the invention may comprise any number of coupled waveguides, and these may assume any shapes and curvatures;
  the pumping radiations can be degenerate or non-generate;
  all the numerical values that have been cited have been provided solely by way of an illustration and can be changed as a function of the considered application. In particular, the wavelength of the useful signal may be greater than or less than that of the source signal; and
  at least one of the waveguides may be provided with a structure that is periodic in the longitudinal direction of this waveguide. In particular, such a structure may be implemented to provide the waveguide with a filtering function. Other waveguide structures also may be combined with the invention, without limitation, including at least one waveguide that has a pattern for structuring in at least one direction perpendicular to the longitudinal direction of this waveguide.

The invention claimed is:

1. A method for frequency-converting a source optical signal in order to produce a useful optical signal, by mixing a plurality of waves as a result of a non-linear interaction between said waves, comprising producing, within at least one waveguide, at least one photon of the useful signal from at least one photon of at least one optical pumping radiation, in accordance with a phase-matching relationship which connects respective propagation constants of the source signal, of said at least one pumping radiation and of the useful signal that are effective in said at least one waveguide,
  each waveguide having at least one individual normal mode that is effective for each of the source signal, of each pumping radiation and of the useful signal propagating in said waveguide separately from each other waveguide,
  each waveguide also having at least one individual parameter that modifies a dispersion relationship which is effective for the source signal, each pumping radiation and the useful signal that propagate in said waveguide according to the individual normal mode of said waveguide,
  said at least one waveguide comprising at least two waveguides, which are arranged so that the individual normal mode of each waveguide is coupled with an individual normal mode of at least one another of the waveguides, for each of the source signal, of each pumping radiation and of the useful signal,
  the method comprising simultaneously injecting the source signal and each pumping radiation into at least one of the waveguides, and extracting the useful signal from at least one of the waveguides,
  each of the source signal, of each pumping radiation and of the useful signal that propagates at a location in the waveguides according to the individual normal mode of one of said waveguides having an intensity distribution between several of the waveguides that varies along the waveguides, since at least some of the individual normal modes of said waveguides are coupled,
  at least one coupling parameter changing an intensity of a coupling that exists between the individual normal modes of at least two of the waveguides,
  wherein respective values of the individual parameters of the waveguides and of said at least one coupling parameter are selected so that the phase-matching relationship is met for at least one set of respective propagation constants of the source signal, of each pumping radiation and of the useful signal, each relating to a collective normal mode of all of the waveguides, that is effective for the propagation of said source signal, of said at least one pumping radiation or of said useful signal, each collective normal mode being such that the source signal, each pumping radiation or the useful signal that propagates in all of the waveguides according to said collective normal mode has an intensity distribution between said waveguides that is constant along the waveguides.

2. The method as claimed in claim 1, wherein the useful optical signal is produced by a four-wave mixing, comprising producing a photon of the useful signal with an additional photon of the source signal from two photons of said at least one pumping radiation.

3. The method as claimed in claim 1, wherein the waveguides are formed in an integrated optical circuit, and are parallel to each other and arranged side-by-side in at least one portion of said integrated optical circuit.

4. The method as claimed in claim 3, wherein at least two of the waveguides are curved and parallel in a bend shared by the at least two waveguides, said at least two waveguides thus having different respective curvatures in the bend, and at least some of the respective individual parameters of said at least two waveguides having values in the bend, such that two portions of at least one and same signal or radiation from among the useful signal, each pumping radiation and the source signal, one of which propagates in any of said at least two waveguides and the other one which propagates in another one of said at least two waveguides, according to the individual normal modes of said waveguides, remain in-phase along radial directions each perpendicular to said at least two waveguides in said bend.

5. The method as claimed in claim 3, wherein the waveguides have respective lengths that range between 1 mm and 100 mm, and any two of the waveguides that are neighboring have a separation distance between them that ranges between 0.125 µm and 3 µm, measured perpendicular to said two neighboring waveguides.

6. The method as claimed in claim 1, wherein the values of the individual parameters of the waveguides and of said at least one coupling parameter are also selected so that the phase-matching relationship is met to nearest second-order in relation to a wavelength of the source signal, around a central wavelength value of said source signal.

7. The method as claimed in claim 1, wherein the source signal has a comb-shaped spectrum within a spectral range that contains at least one portion of said source signal.

8. The method as claimed in claim 1, wherein two opposite ends of a same one of the waveguides are connected to each other in order to form a loop for recirculating optical signals and radiations.

9. The method as claimed in claim 1, wherein the source signal is made up of at least one spectral component that has a wavelength ranging between 1.3 µm and 1.8 µm, preferably between 1.5 µm and 1.6 µm, each pumping radiation is a laser radiation with a wavelength ranging between 1.2 µm and 2.6 µm, preferably between 1.7 µm and 2.1 µm, and the useful signal is made up of at least one other spectral component, which has a wavelength ranging between 2 µm and 6 µm, preferably between 2.2 µm and 4.5 µm.

10. The method as claimed in claim 1, wherein the useful signal is used for a spectroscopic application.

11. An optical device, comprising a plurality of waveguides each having an individual normal mode that is effective for optical radiations propagating in said waveguide separately from each other waveguide, each waveguide having at least one individual parameter that modifies a dispersion relationship effective for each radiation that propagates in said waveguide according to the individual normal mode of said waveguide, said at least two waveguides being arranged so that the individual normal mode of each of the waveguides is coupled with an individual normal mode of at least one another of the waveguides, each radiation that propagates at a location in the waveguides according to the individual normal mode of one of said waveguides having an intensity distribution between several of waveguides that varies along the waveguides, since at least some of the individual normal modes of said waveguides are coupled, the device being such that at least one coupling parameter modifies an intensity of a coupling that exists between the individual normal modes of at least two of the waveguides, wherein respective values of the individual parameters of the waveguides and of said at least one coupling parameter are such that a method as claimed in claim 1 can be implemented using said device.

* * * * *